(12) United States Patent
Hara

(10) Patent No.: US 8,199,330 B2
(45) Date of Patent: Jun. 12, 2012

(54) TRACKING-TYPE LASER INTERFEROMETER

(75) Inventor: Shinichi Hara, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 310 days.

(21) Appl. No.: 12/707,255

(22) Filed: Feb. 17, 2010

(65) Prior Publication Data

US 2010/0208232 A1    Aug. 19, 2010

(30) Foreign Application Priority Data

Feb. 17, 2009    (JP) ................................ 2009-033547

(51) Int. Cl.
*G01B 11/02*    (2006.01)
*G01C 3/08*    (2006.01)
(52) U.S. Cl. ...................................... 356/498; 356/4.09
(58) Field of Classification Search ................ 356/4.09, 356/496, 498, 500
See application file for complete search history.

(56) References Cited

U.S. PATENT DOCUMENTS

| | | | | | |
|---|---|---|---|---|---|
| 4,714,339 | A | * | 12/1987 | Lau et al. | 356/4.09 |
| 4,790,651 | A | * | 12/1988 | Brown et al. | 356/4.09 |
| 7,388,674 | B2 | * | 6/2008 | Yanaka et al. | 356/498 |
| 7,538,888 | B2 | * | 5/2009 | Hara et al. | 356/498 |
| 7,872,733 | B2 | * | 1/2011 | Taketomi et al. | 356/4.09 |
| 2003/0043362 | A1 | * | 3/2003 | Lau | 356/4.09 |
| 2003/0206285 | A1 | * | 11/2003 | Lau | 356/4.09 |

FOREIGN PATENT DOCUMENTS

JP    2008-128899    6/2008

* cited by examiner

*Primary Examiner* — Michael A Lyons
(74) *Attorney, Agent, or Firm* — Rankin, Hill & Clark LLP

(57) ABSTRACT

A tracking-type laser interferometer in which a pattern emission control unit controls a changing mechanism such that light is emitted along a predetermined pattern when judged by a first judgment unit that at least one of received-light amounts at first and second light reception units is not greater than a first threshold value. A tracking control unit causes the changing mechanism to keep track of a retro reflector when judged by a second judgment unit that both of the received-light amounts at the first and second light reception units are greater than second threshold values during a time period in which the pattern emission control unit controls the changing mechanism for the emission of light along the pattern. The interferometer emits light along the pattern to search for the retro reflector upon losing sight thereof. Upon detection, the interferometer can keep track of the reflector again and resume measurement.

6 Claims, 7 Drawing Sheets

TRACKING-TYPE LASER INTERFEROMETER

BACKGROUND OF THE INVENTION

1. Field of the Invention

The invention relates to a tracking-type laser interferometer.

2. Description of the Related Art

A tracking-type laser interferometer is used as an apparatus for measuring a distance to a movable body. An example of a tracking-type laser interferometer of related art is disclosed in Japanese Unexamined Patent Application Publication No. 2008-128899. The tracking-type laser interferometer disclosed in the above patent document splits a beam of laser light into a beam of measurement light and a beam of reference light. The interferometer emits the measurement light toward a retro reflector that is attached to the movable body. The interferometer performs control processing such that the shift amount of return light propagating back from the retro reflector should fall within a predetermined range, thereby keeping track of the retro reflector. The reference light is reflected at the reference plane. The reference light reflected at the reference plane and the return light propagating back from the retro reflector turn into interference light. The interferometer utilizes the interference light to measure a distance therefrom to the retro reflector (movable body).

Backward light that is supposed to propagate back from a retro reflector will not actually return to an interferometer when measurement light is not properly directed at the retro reflector or when there is an obstacle between the interferometer and the retro reflector. In such cases, the tracking-type laser interferometer of related art loses sight of the retro reflector and thus continues emitting measurement light blindly in the lost direction. For this reason, the tracking-type laser interferometer of related art cannot resume the measurement of a moveable object when the interferometer loses sight of the retro reflector, which is a problem that remains to be solved.

SUMMARY OF THE INVENTION

An advantage of some aspects of the invention is to provide a tracking-type laser interferometer that is capable of resuming measurement even when the interferometer loses sight of a retro reflector.

A tracking-type laser interferometer according to a first aspect of the invention has the following features. The tracking-type laser interferometer includes a light source, a retro reflector, a reference plane, a first light receiving section, a second light receiving section, a changing mechanism, a changing mechanism controlling section, and a distance calculating section. The retro reflector is attached to a movement member and reflects light propagating from the light source. The reference plane reflects light coming from the light source. The first light receiving section receives interference light turned from return light and reference light. The return light propagates back from the retro reflector. The reference light is reflected at the reference plane. The first light receiving section outputs a received-light signal dependent on received-light amount and a change in a distance to the retro reflector upon receiving the interference light. The second light receiving section receives the return light to output a received-light signal dependent on received-light amount and shift amount of the return light. The changing mechanism changes a direction of emission of the light propagating from the light source. The changing mechanism controlling section controls the changing mechanism on the basis of the received-light signal outputted from the second light receiving section such that the shift amount should fall within a predetermined range to cause the changing mechanism to keep track of the retro reflector. The distance calculating section calculates the distance from a predetermined reference point to the retro reflector by means of the received-light signal outputted from the first light receiving section. The changing mechanism controlling section includes a first judging section, a second judging section, a pattern emission controlling section, and a tracking controlling section. The first judging section judges whether at least one of the received-light amount at the first light receiving section and the received-light amount at the second light receiving section is not greater than (i.e., is less than or equal to) a predetermined first threshold value, which is set individually for each of the first and second light receiving sections. The pattern emission controlling section controls the changing mechanism such that the light propagating from the light source should be emitted along a predetermined pattern in a case where it has been judged by the first judging section that at least one of the received-light amount at the first light receiving section and the received-light amount at the second light receiving section is not greater than the predetermined first threshold value. The second judging section judges whether both of the received-light amount at the first light receiving section and the received-light amount at the second light receiving section are greater than, or not less than, predetermined second threshold values, which are set respectively for the first and second light receiving sections. The tracking controlling section controls the changing mechanism such that the shift amount should fall within the predetermined range to cause the changing mechanism to keep track of the retro reflector in a case where it has been judged by the second judging section that both of the received-light amount at the first light receiving section and the received-light amount at the second light receiving section are greater than, or not less than, the predetermined second threshold values.

In the configuration of a tracking-type laser interferometer according to the above aspect of the invention, the pattern emission controlling section controls the changing mechanism such that the light propagating from the light source should be emitted along a predetermined pattern in a case where it has been judged by the first judging section that at least one of the received-light amount at the first light receiving section and the received-light amount at the second light receiving section is not greater than (i.e., is less than or equal to) the predetermined first threshold value. Then, the tracking controlling section causes the changing mechanism to keep track of the retro reflector in a case where it has been judged by the second judging section that both of the received-light amount at the first light receiving section and the received-light amount at the second light receiving section are greater than, or not less than, the predetermined second threshold values during a time period in which the pattern emission controlling section controls the changing mechanism for the emission of light propagating from the light source along the predetermined pattern. A tracking-type laser interferometer according to the above aspect of the invention, which may be hereinafter simply referred to as interferometer, emits a beam of light along the predetermined pattern to search for the retro reflector upon losing sight of the retro reflector. Upon detecting the retro reflector, the interferometer can keep track of the retro reflector again. Therefore, it is possible to resume measurement even when the interferometer loses sight of the retro reflector.

A tracking-type laser interferometer according to a second aspect of the invention has the following features. The tracking-type laser interferometer includes a light source, a retro reflector, a reference plane, a first light receiving section, a second light receiving section, a changing mechanism, a changing mechanism controlling section, and a distance calculating section. The retro reflector is attached to a movement member and reflects light propagating from the light source. The reference plane reflects light coming from the light source. The first light receiving section receives interference light turned from return light and reference light. The return light propagates back from the retro reflector. The reference light is reflected at the reference plane. The first light receiving section outputs a received-light signal dependent on received-light amount and a change in a distance to the retro reflector upon receiving the interference light. The second light receiving section receives the return light to output a received-light signal dependent on received-light amount and shift amount of the return light. The changing mechanism changes a direction of emission of the light propagating from the light source. The changing mechanism controlling section controls the changing mechanism based upon the received-light signal outputted from the second light receiving section such that the shift amount should fall within a predetermined range to cause the changing mechanism to keep track of the retro reflector. The distance calculating section calculates the distance from a predetermined reference point to the retro reflector by means of the received-light signal outputted from the first light receiving section. The changing mechanism controlling section includes a first judging section, a second judging section, a pattern emission controlling section, and a tracking controlling section. The first judging section judges, on the basis of either one of the received-light signals outputted respectively from the first and second light receiving sections only, whether the received-light amount at the one light receiving section is not greater than the predetermined first threshold value or not. The pattern emission controlling section controls the changing mechanism such that the light propagating from the light source should be emitted along a predetermined pattern in a case where it has been judged by the first judging section that the received-light amount at the one light receiving section is not greater than the predetermined first threshold value. The second judging section judges, on the basis of the one of the received-light signals outputted respectively from the first and second light receiving sections only, whether the received-light amount at the one light receiving section is greater than, or not less than, the predetermined second threshold value or not. The tracking controlling section controls the changing mechanism such that the shift amount should fall within the predetermined range to cause the changing mechanism to keep track of the retro reflector in a case where it has been judged by the second judging section that the received-light amount at the one light receiving section is greater than, or not less than, the predetermined second threshold value.

Since an interferometer according to the second aspect of the invention has some features that are the same as those of an interferometer according to the first aspect of the invention, it produces the same or similar advantageous effects. Besides these advantages, an interferometer according to the second aspect of the invention has an advantage of a simpler configuration because it is judged whether the interferometer has now lost sight of the retro reflector and whether the interferometer has now found the retro reflector on the basis of either one of received-light signals outputted respectively from the first and second light receiving sections only.

In a tracking-type laser interferometer according to the first aspect of the invention or the second aspect of the invention, it is preferable that the predetermined pattern should be a spiral pattern that starts at a given point and goes away from the given point outward while turning around the given point as the center of the spiral pattern on a plane; the given point should lie in a direction of emission of light propagating from the light source when it is judged by the first judging section that the received-light amount is not greater than the predetermined first threshold value; the plane should pass through the given point; and the plane should be orthogonal to the direction of emission of the light propagating from the light source.

The emission pattern of light that is used when the interferometer searches for the retro reflector is a spiral pattern whose center is the given point that lies in the direction of emission of light when the interferometer lost sight of the retro reflector. With such a preferred feature, it is possible to search for the retro reflector efficiently without a detection failure, or with a substantially reduced risk of a detection failure.

In the above preferred tracking-type laser interferometer, it is further preferable that the given point should be set at a position away from the reference point by a certain distance to the retro reflector calculated by the distance calculating section when judged by the first judging section that the received-light amount is not greater than the predetermined first threshold value; the predetermined pattern should be a spiral pattern that includes a plurality of curved successive turnings and has a constant separation distance between the inner turning and the outer turning of each two adjacent turnings; and the constant separation distance between the inner turning and the outer turning of each two adjacent turnings of the spiral should be set at a value that is not larger than the width of a light-receivable area of the light receiving section for which it has been judged by the first judging section that the received-light amount is not greater than the predetermined first threshold value.

The emission pattern of light that is used when the interferometer searches for the retro reflector is a spiral pattern that includes a plurality of curved successive turnings and has a constant separation distance between the inner turning and the outer turning of each two adjacent turnings. In addition, the constant separation distance between the inner turning and the outer turning of each two adjacent turnings of the spiral is set at a value that is not larger than the width of a light-receivable area of the light receiving section for which it has been judged by the first judging section that the received-light amount is not greater than the predetermined first threshold value. With such a preferred feature, it is possible to substantially reduce the risk of a detection failure.

BRIEF DESCRIPTION OF THE DRAWINGS

FIG. 4 is a diagram that schematically illustrates an example of a given point that is set by a pattern generation unit according to an exemplary embodiment of the invention, and the like;

DESCRIPTION OF THE PREFERRED EMBODIMENTS

Figure 1:
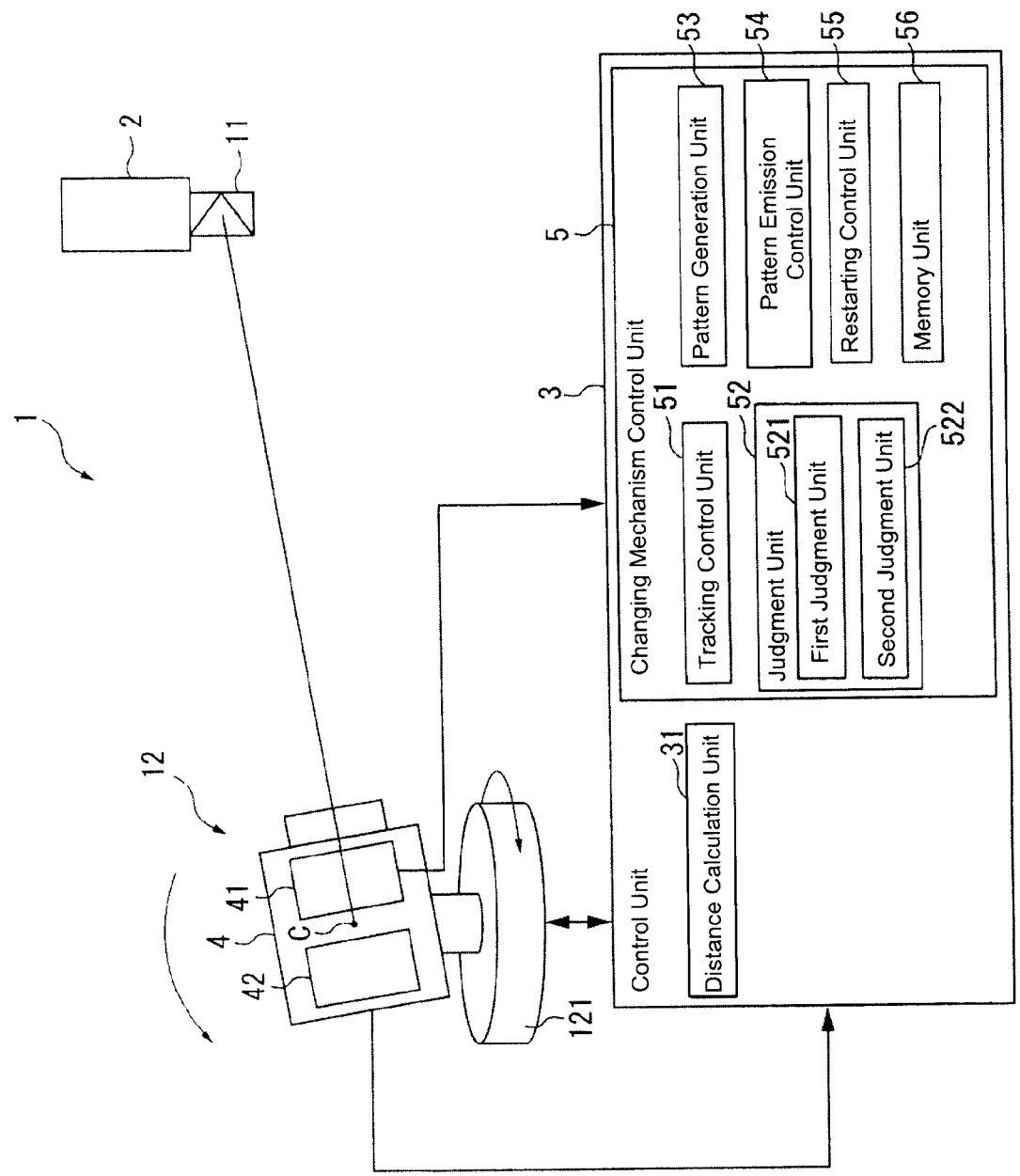
FIG. 1 is a diagram that schematically illustrates an example of the configuration of a tracking-type laser interferometer according to an exemplary embodiment of the invention.

With reference to the accompanying drawings, an exemplary embodiment of the present invention will now be explained. FIG. 1 is a diagram that schematically illustrates an example of the configuration of a tracking-type laser interferometer 1 according to the present embodiment of the invention. The tracking-type laser interferometer 1 is hereinafter simply referred to as "interferometer 1". The interferometer 1 keeps track of a movable body 2 and measures a distance therefrom to the movable body 2. The movable body 2 is mounted on or provided as a component of an industrial machine. For example, the industrial machine drives a moving mechanism to move the movable body 2, thereby measuring a target object or performs machining processing on the target object. An example of the industrial machine is a three coordinate measuring machine. An example of the movable body 2 is a slider of the three-dimensional measuring machine. A probe for measuring a target object is fixed to the slider.

As illustrated in FIG. 1, the interferometer 1 is provided with a retro reflector 11, a measurement unit 12, and a control unit 3. The control unit 3 controls the operation of the measurement unit 12. The retro reflector 11 is attached to the movable body 2. The retro reflector 11 reflects a beam of incident light with the following reflection characteristics. The propagation direction of a beam of reflected light and the propagation direction of the beam of incident light are parallel to each other. In addition, the reflected light and the incident light are centrosymmetric, that is, symmetric with respect to the center of the retro reflector 11 (i.e., point symmetry). Therefore, in a case where the incident light enters the retro reflector 11 at a certain position off the center, the path of the reflected light is shifted from the path of the incident light.

The measurement unit 12 is provided with an optical system 4 and a changing mechanism 121. The configuration of the optical system 4 is known as described in detail in, for example, Japanese Unexamined Patent Application Publication No. 2008-128899. Therefore, the configuration of the optical system 4 is briefly explained below.

Figure 2:
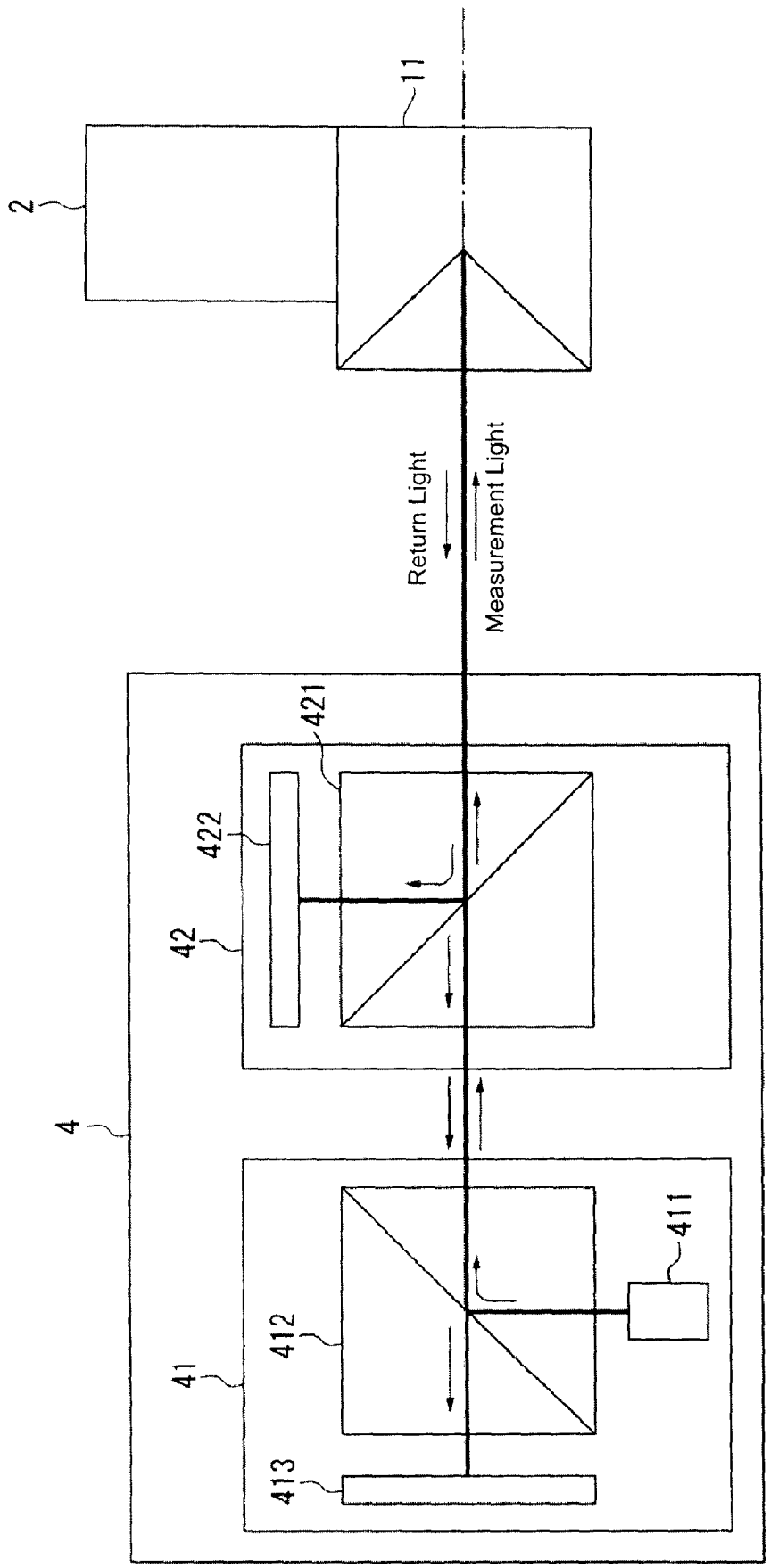
FIG. 2 is a diagram that schematically illustrates an example of the configuration of an optical system.
Figure 3:
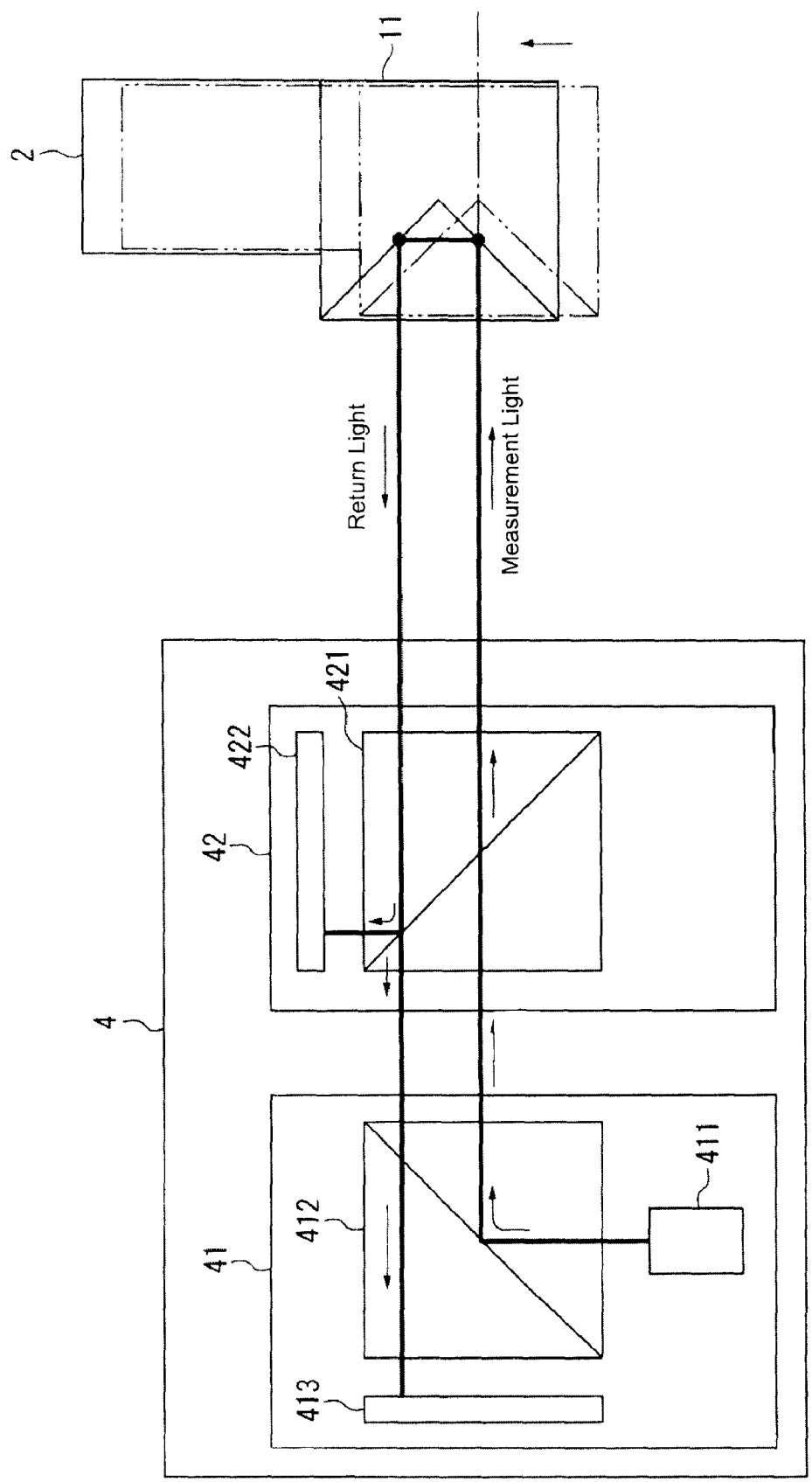
FIG. 3 is a diagram that schematically illustrates an example of a shift of return light from measurement light, which occurs due to the movement of a retro reflector.

FIG. 2 is a diagram that schematically illustrates an example of the configuration of the optical system 4. FIG. 3 is a diagram that schematically illustrates an example of a shift of return light, which is light after reflection at the retro reflector 11, from measurement light, which is emitted from the optical system 4 and enters the retro reflector 11 as incident light. The illustrated shift occurs due to the movement of the retro reflector 11. In FIG. 3, two-dot chain lines show the position of the retro reflector 11 before movement and the position of the movable body 2 before movement. As illustrated in FIG. 2, the optical system 4 includes a distance measurement optical system 41 and a tracking optical system 42. The distance measurement optical system 41 is used for measuring a distance to the retro reflector 11. The tracking optical system 42 is used for keeping track of the retro reflector 11.

The distance measurement optical system 41 includes a laser light source 411, a splitter 412, a plane mirror, and a first light reception unit 413. The plane mirror, which is not illustrated in the drawing, is an example of a reference plane according to an aspect of the invention. The first light reception unit 413 is provided with a photo detector (PD). The tracking optical system 42 includes a splitter 421 and a second light reception unit 422. The second light reception unit 422 is provided with a quadrisected (i.e., four-divided) photodiode (PD) or a two-dimensional position sensitive detector (PSD).

The optical system 4 that includes the above optical components operates as follows. The splitter 412 splits a beam of laser light emitted from the laser light source 411 into a beam of reference light, which is not shown in the drawing, and a beam of measurement light. The plane mirror reflects the reference light. Thereafter, the splitter 412 reflects the reference light toward the first light reception unit 413. On the other hand, the measurement light that has passed through the splitter 421 is emitted toward the retro reflector 11. The measurement light is reflected at the retro reflector 11 to turn into return light, which is backward light propagating back toward the optical system 4. The return light enters the optical system 4. The measurement light sometimes enters the retro reflector 11 at a certain position off the center thereof because of the movement of the retro reflector 11 (refer to FIG. 3). In such a case, the measurement light is reflected with an optical shift orthogonal to, or in relation to, the direction of the incidence of the measurement light. Therefore, the path of the return light is shifted from the path of the measurement light.

Some part of the return light that enters the optical system 4 is reflected at the splitter 421. The second light reception unit 422 receives the light reflected by the splitter 421. The return light enters at a certain position off the center of the light reception plane of the second light reception unit (e.g., quadrisected PD) 422 depending on the amount of the shift. The light reception plane of the second light reception unit 422 is sectioned in four blocks, that is, the upper left section, the upper right section, the lower left section, and the lower right section. The second light reception unit 422 generates four received-light signals. The level of each of the four received-light signals depends on the amount of the return light that enters the corresponding one of the four sections of the light reception plane. The second light reception unit 422 outputs the four received-light signals (which may be hereinafter collectively referred to as a second received-light signal) to the control unit 3. In other words, the second light reception unit 422 outputs the second received-light signal dependent on the amount of the received light and the shift amount of the return light to the control unit 3.

The other part of the return light passes through the splitter 421. After passing through the splitter 421, the other part of the return light and the reference light reflected at the plane mirror turn into interference light, which is received at the first light reception unit 413. Upon receiving the interference light turned from the remaining part of the return light and the reference light, the first light reception unit 413 outputs a first received-light signal, which is dependent on the amount of the received light and a change in a distance between the optical system 4 and the retro reflector 11, to the control unit 3. Each of the first received-light signal and the second received-light signal may be referred to as a received-light signal.

Referring back to FIG. 1, the changing mechanism 121 includes a rotation mechanism that has two rotation axes that are orthogonal to each other. Specifically, the changing mechanism 121 includes an azimuthal angle rotation sub-mechanism and an elevation angle rotation sub-mechanism. The azimuthal angle rotation sub-mechanism changes the angle of direction of measurement light. The elevation angle rotation sub-mechanism changes the angle of elevation of measurement light. The changing mechanism 121 drives the azimuthal angle rotation sub-mechanism and the elevation angle rotation sub-mechanism to change the direction of emission of measurement light, that is, the angle of direction thereof and the angle of elevation thereof. A sensor is mounted on each rotation sub-mechanism. The sensor mounted on the azimuthal angle rotation sub-mechanism detects the rotation angle of the axis (i.e., rotation shaft) thereof as the angle of direction of measurement light and outputs a detection result to the control unit 3. The sensor mounted on the elevation angle rotation sub-mechanism detects the rotation angle of the axis thereof as the angle of elevation of measurement light and outputs a detection result to the control unit 3. The point where the two rotation axes of the rotation mechanism intersect with each other is taken as a reference point c. The control unit 3 measures the distance from the reference point c to the retro reflector 11.

The control unit 3 includes a distance calculation unit 31 and a changing mechanism control unit 5. The distance calculation unit 31 calculates the distance from the reference point c to the retro reflector 11 (movable body 2) by means of the received-light signal outputted from the first light reception unit 413 of the distance measurement optical system 41.

The changing mechanism control unit 5 causes the changing mechanism 121 to keep track of the retro reflector 11. The changing mechanism control unit 5 includes a tracking control unit 51, a judgment unit 52, a pattern generation unit 53, a pattern emission control unit 54, a restarting control unit 55, and a memory unit 56. The memory unit 56 stores various values that are required when the changing mechanism control unit 5 controls the changing mechanism 121.

The tracking control unit 51 controls the changing mechanism 121 on the basis of the received-light signal outputted from the second light reception unit 422. The changing mechanism 121 is controlled in such a manner that the shift amount of return light should fall within a predetermined range. With such emission-direction control, the tracking control unit 51 causes the changing mechanism 121 to keep track of the retro reflector 11. More specifically, as explained above, the second light reception unit (e.g., quadrisected PD) 422 outputs, to the control unit 3, four received-light signals the level of each of which depends on the amount of return light that enters the corresponding one of four sections of a light reception plane. The tracking control unit 51 drives the changing mechanism 121 in such a way as to equalize the level of the received-light signals corresponding to the upper sections of the light reception plane with the level of the received-light signals corresponding to the lower sections of the light reception plane, thereby changing the angle of elevation of measurement light. In addition, the tracking control unit 51 drives the changing mechanism 121 in such a way as to equalize the level of the received-light signals corresponding to the left sections of the light reception plane with the level of the received-light signals corresponding to the right sections of the light reception plane, thereby changing the angle of direction of measurement light. With the above emission-direction control, it is ensured that measurement light is always directed toward the center of the retro reflector 11.

The judgment unit 52 includes a first judgment unit 521 and a second judgment unit 522. The function of the first judgment unit 521 is explained below. The function of the second judgment unit 522 will be explained later. The first judgment unit 521 makes a judgment on the basis of a received-light signal outputted from each of the first light reception unit 413 and the second light reception unit 422. For example, the first judgment unit 521 judges whether either one or both of the amount of light received at the first light reception unit 413 and the amount of light received at the second light reception unit 422 is/are not greater than a predetermined first threshold value(s) or not. The predetermined first threshold values are set respectively for the first light reception unit 413 and the second light reception unit 422. That is, the first judgment unit 521 judges whether or not the levels (which indicate received-light amount) of the received-light signals outputted respectively from the first light reception unit 413 and the second light reception unit 422 are not greater than the predetermined levels (i.e., thresholds), which are set respectively for the first light reception unit 413 and the second light reception unit 422.

The pattern generation unit 53 generates a spiral pattern as a locus along which measurement light is to be emitted in a case where it has been judged by the first judgment unit 521 that either one or both of the amount of light received at the first light reception unit 413 and the amount of light received at the second light reception unit 422 is/are not greater than the predetermined first threshold value(s). The interferometer 1 searches for the retro reflector 11 while emitting measurement light along the generated pattern.

Figure 4:
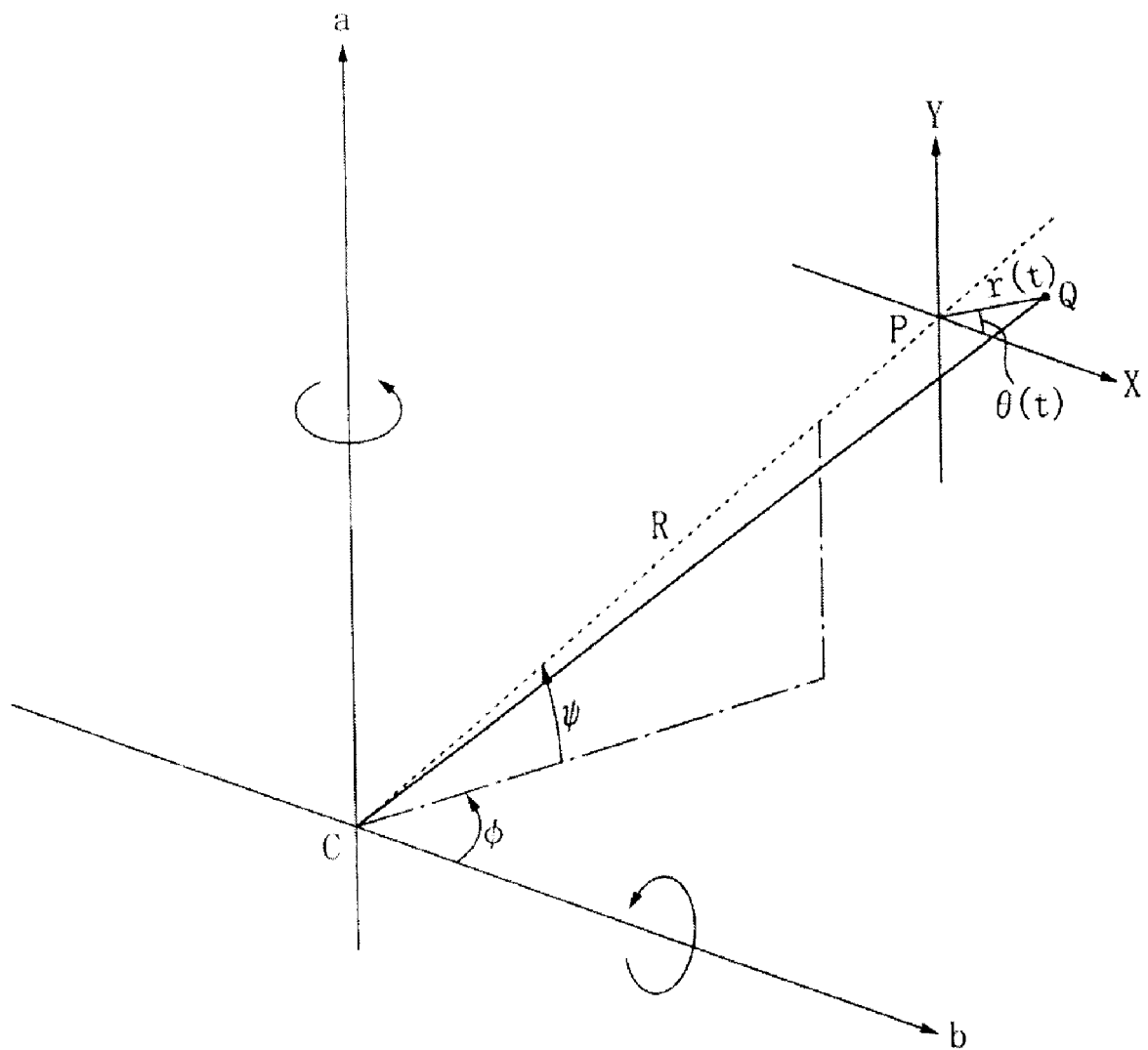

FIG. 4 is a diagram that schematically illustrates an example of a point P that is set by the pattern generation unit 53 on a virtual line that goes in the direction of emission of measurement light and an X-Y plane that passes through the point P and is orthogonal to the emission direction of the measurement light according to an exemplary embodiment of the invention. Specifically, the pattern generation unit 53 sets the point P in a case where it has been judged by the first judgment unit 521 that at least one of the amounts of light received respectively at the first light reception unit 413 and the second light reception unit 422 is not greater than the predetermined first threshold value. As illustrated in FIG. 4, the point P lies on a virtual line that goes in the direction of emission of measurement light at the time of such a judgment (as shown by an angle of direction $\phi$ and an angle of elevation $\phi$). In addition, the point P is set at a position on the emission-direction line away from the reference point c by a distance R. The distance R is a distance to the retro reflector 11 that was calculated by the distance calculation unit 31 at the time of the judgment (to be exact, immediately before the judgment).

Next, the pattern generation unit 53 sets the X-Y plane. The X axis of the X-Y plane passes through the point P and is parallel to one of the two rotation axes of the changing mechanism 121, which are orthogonal to each other, specifically, a rotation shaft b of the elevation angle rotation sub-mechanism, which changes the angle of elevation $\phi$ of measurement light. The Y axis of the X-Y plane passes through the point P and is parallel to the other of the two rotation axes of the changing mechanism 121, that is, a rotation shaft a of the azimuthal angle rotation sub-mechanism, which changes the angle of direction $\phi$ of measurement light.

Figure 5:
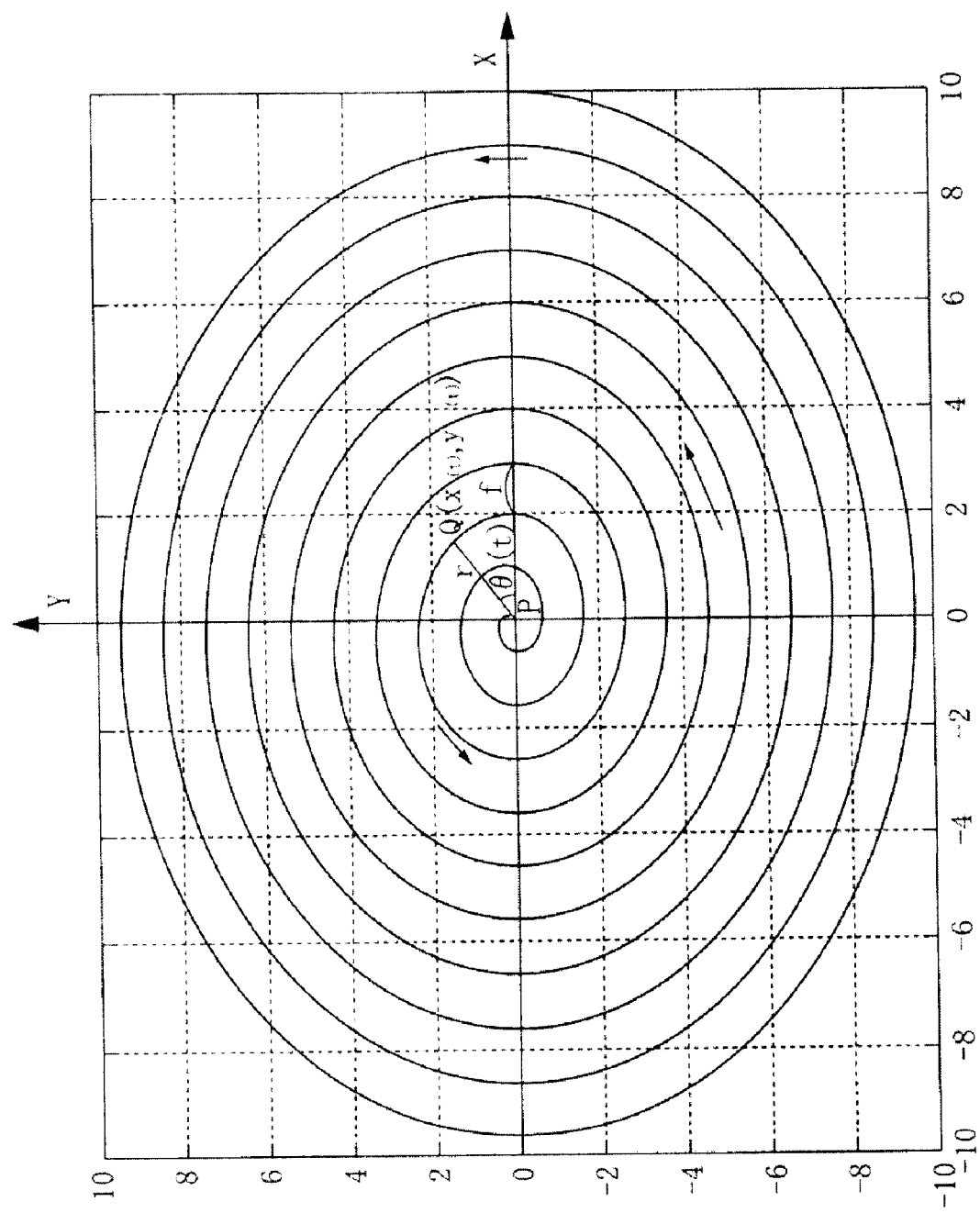
FIG. 5 is a diagram that schematically illustrates an example of a spiral pattern that is generated by the pattern generation unit according to an exemplary embodiment of the invention.

FIG. 5 is a diagram that schematically illustrates an example of a spiral pattern that is generated on the X-Y plane by the pattern generation unit 53 according to an exemplary embodiment of the invention. Next, as illustrated in FIG. 5, the pattern generation unit 53 determines a spot coordinate Q (x, y) of measurement light as follows: $(x(t), y(t))=(r(t)\cos\theta(t), r(t)\sin\theta(t))$. That is, the pattern generation unit 53 generates an Archimedean spiral pattern as a locus along which measurement light is to be emitted. In the present embodiment of the invention, the spiral pattern is expressed as the locus of the point Q, includes a plurality of curved successive turnings, and has a constant separation distance f between the inner turning and the outer turning of each two adjacent turnings. In the above formula and in the drawing, r(t) denotes a distance from the point P to the point Q, whereas θ(t) denotes an angle that is formed by a line segment PQ and the X axis. Note that both of r(t) and θ(t) are functions increasing monotonically over time.

The width d of a light-receivable area, which is an area where light can be received, of each of the first light reception unit 413 and the second light reception unit 422 is small. For example, the width d of the light-receivable area is approximately 2.5 mm. For this reason, r(t) is set as shown in the following formula (1) in order to detect the retro reflector 11 without a detection failure.

$$r(t) \le \frac{\theta(t)}{2\pi} \cdot d \qquad (1)$$

In addition, to detect the retro reflector 11 successfully, the constant separation distance f between the inner turning and the outer turning of each two adjacent turnings of the spiral is set at a value that is not larger than the width d of the light-receivable area of each of the first light reception unit 413 and the second light reception unit 422. In a case where the width of the light-receivable area of the first light reception unit 413 is not the same as that of the second light reception unit 422, the constant separation distance f between the inner turning and the outer turning of each two adjacent turnings of the spiral is set at a value that is not larger than the smaller one of the two different widths.

Referring back to FIG. 1, the pattern emission control unit 54 controls the changing mechanism 121 such that measurement light should be emitted along the spiral pattern generated by the pattern generation unit 53. The second judgment unit 522 of the judgment unit 52 makes a judgment during a time period in which the pattern emission control unit 54 controls the changing mechanism 121 for the emission of measurement light along the spiral pattern. For example, the second judgment unit 522 judges whether both of the amount of light received at the first light reception unit 413 and the amount of light received at the second light reception unit 422 are greater than (or not less than) predetermined second threshold values or not. The predetermined second threshold values are set respectively for the first light reception unit 413 and the second light reception unit 422. In the present embodiment of the invention, it is assumed that the second threshold value is preset at a value that is equal to the first threshold value, which is used when the first judgment unit 521 performs judgment processing. However, the scope of the invention is not limited thereto. The second threshold value may be preset at a value that is larger than the first threshold value.

The memory unit 56 memorizes the emission direction of measurement light at the time of the judgment in a case where it has been judged by the second judgment unit 522 that both of the amount of light received at the first light reception unit 413 and the amount of light received at the second light reception unit 422 are greater than the predetermined second threshold values. Then, in a case where it was judged by the second judgment unit 522 that both of the amount of light received at the first light reception unit 413 and the amount of light received at the second light reception unit 422 are greater than the predetermined second threshold values, the restarting control unit 55 reads out and acquires information on the emission direction of measurement light at the time of the judgment from the memory unit 56. The restarting control unit 55 controls the changing mechanism 121 such that measurement light should be emitted in the acquired emission direction.

Figure 6:
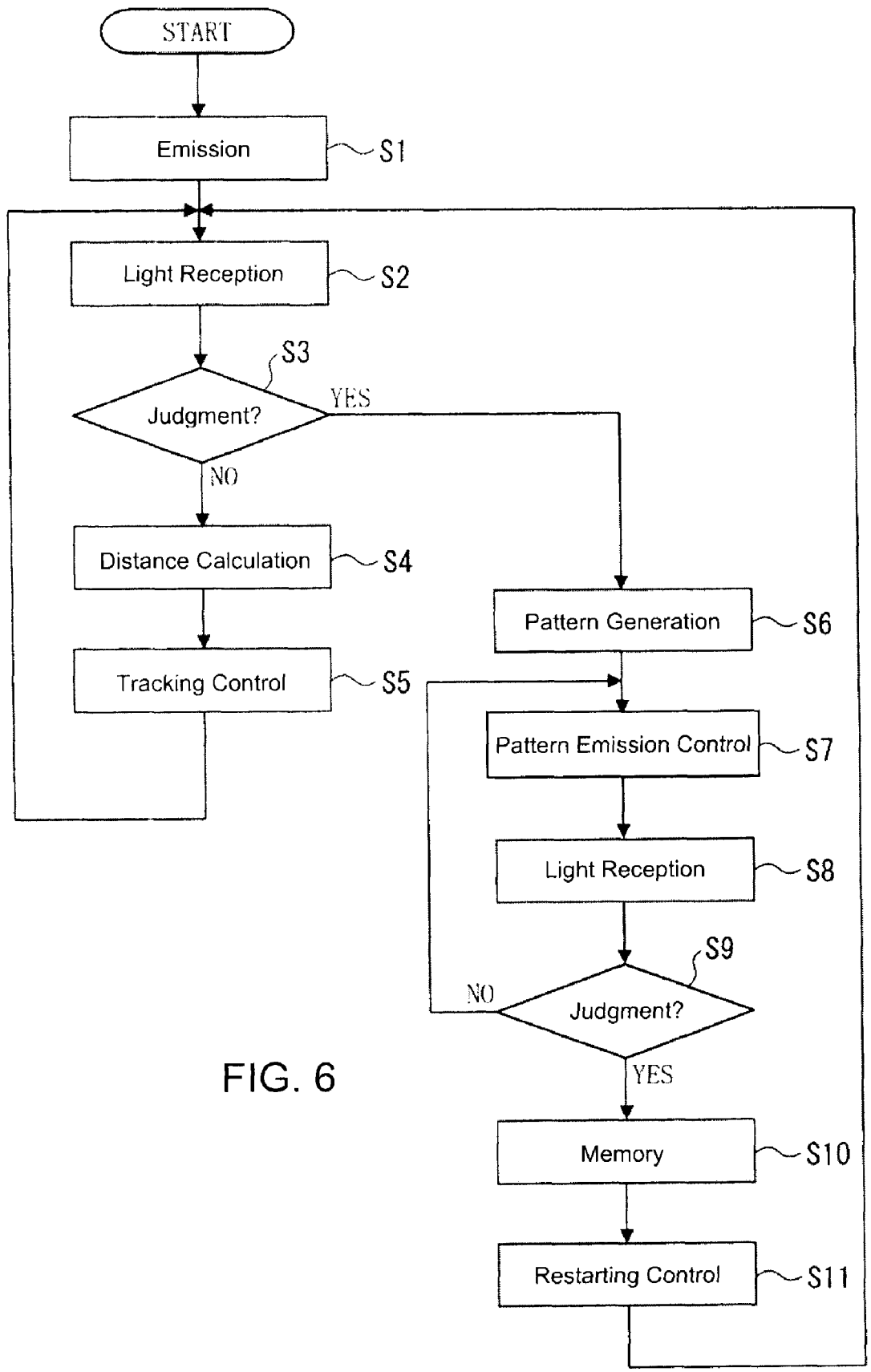
FIG. 6 is a flowchart that schematically illustrates an example of the flow of a method for measuring a distance to a movable body by means of the interferometer according to an exemplary embodiment of the invention.

A method for measuring a distance to the movable body 2 by means of the interferometer 1 is briefly explained below. FIG. 6 is a flowchart that schematically illustrates an example of the flow of a measurement method according to an exemplary embodiment of the invention. As a first step, the interferometer 1 emits a beam of measurement light toward the retro reflector 11 attached to the movable body 2 (hereinafter referred to as emission step S1). The emission is triggered by, for example, an operation command given by an operator. After the emission step S1, the first light reception unit 413 and the second light reception unit 422 receive a beam of interference light and a beam of return light, which propagates back from the retro reflector 11, respectively (hereinafter referred to as light reception step S2).

After the light reception step S2, the first judgment unit 521 makes a judgment on the basis of a received-light signal outputted from each of the first light reception unit 413 and the second light reception unit 422; for example, the first judgment unit 521 judges whether either one or both of the amount of light received at the first light reception unit 413 and the amount of light received at the second light reception unit 422 is/are not greater than the predetermined first threshold value(s), where the predetermined first threshold values are set respectively for the first light reception unit 413 and the second light reception unit 422 (hereinafter referred to as judgment step S3).

In a case where it has been judged by the first judgment unit 521 that neither of the amount of light received at the first light reception unit 413 and the amount of light received at the second light reception unit 422 is not greater than the predetermined first threshold value (S3: NO), the distance calculation unit 31 calculates the distance from the reference point c to the retro reflector 11 (movable body 2) on the basis of the received-light signal outputted from the first light reception unit 413 (hereinafter referred to as distance calculation step S4).

After the distance calculation step S4, the tracking control unit 51 controls the changing mechanism 121 on the basis of the received-light signal outputted from the second light reception unit 422 such that the shift amount of return light should fall within a predetermined range, thereby causing the changing mechanism 121 to keep track of the retro reflector 11 (hereinafter referred to as tracking control step S5). After the tracking control step S5, the process returns to the step S2. Then, the steps S2 to S5 are repeated for the tracking of the retro reflector 11 and the measurement of a distance to the retro reflector 11.

In a case where it has been judged by the first judgment unit 521 that either one or both of the amount of light received at the first light reception unit 413 and the amount of light received at the second light reception unit 422 is/are not greater than the predetermined first threshold value(s) (S3: YES), which indicates that the interferometer 1 has now lost sight of the retro reflector 11, the pattern generation unit 53 generates a spiral pattern as a locus along which measurement light is to be emitted (hereinafter referred to as pattern generation step S6).

After the pattern generation step S6, the pattern emission control unit 54 controls the changing mechanism 121 in such a manner that measurement light should be emitted along the spiral pattern generated by the pattern generation unit 53

(hereinafter referred to as pattern emission control step S7). Steps S8 and S9 explained below are executed after the pattern emission control step S7. The pattern emission control step S7 is repeated until a predetermined judgment is made in the step S9. Accordingly, the pattern emission control unit 54 continues controlling the changing mechanism 121 till the judgment.

Specifically, the first light reception unit 413 and the second light reception unit 422 receive a beam of interference light and a beam of return light respectively during a time period in which the pattern emission control unit 54 controls the changing mechanism 121 (hereinafter referred to as light reception step S8). After the light reception step S8, the second judgment unit 522 makes a judgment on the basis of a received-light signal outputted from each of the first light reception unit 413 and the second light reception unit 422; for example, the second judgment unit 522 judges whether both of the amount of light received at the first light reception unit 413 and the amount of light received at the second light reception unit 422 are greater than (or not less than) the predetermined second threshold values or not, where the predetermined second threshold values are set respectively for the first light reception unit 413 and the second light reception unit 422 (hereinafter referred to as judgment step S9).

In a case where it has been judged by the second judgment unit 522 that either one or both of the amount of light received at the first light reception unit 413 and the amount of light received at the second light reception unit 422 is/are not greater than the predetermined second threshold value(s) (S9: NO), the process returns to the pattern emission control step S7. In this case, the steps S7, S8, and S9 are repeated for the emission of measurement light along the spiral pattern.

In a case where it has been judged by the second judgment unit 522 that both of the amount of light received at the first light reception unit 413 and the amount of light received at the second light reception unit 422 are greater than the predetermined second threshold values during a time period in which the pattern emission control unit 54 controls the changing mechanism 121 for the emission of measurement light along the spiral pattern (S9: YES), which indicates that the interferometer 1 has now found the retro reflector 11, the memory unit 56 memorizes the emission direction of measurement light at the time of detection (hereinafter referred to as memory step S10). After the memory step S10, the restarting control unit 55 acquires information on the emission direction of measurement light from the memory unit 56 and controls the changing mechanism 121 such that measurement light should be emitted in the acquired emission direction (hereinafter referred to as restarting control step S11).

As explained above, in the present embodiment of the invention, the restarting control unit 55 controls the changing mechanism 121 such that measurement light should be emitted in the emission direction at the time of detection in a case where the retro reflector 11 has now been detected. If the measurement of a distance to the retro reflector 11 were resumed immediately upon the detection of the retro reflector 11, the emission direction of measurement light could be shifted from the direction in which the retro reflector 11 has now been found due to the inertial force of the changing mechanism 121 that acts during a time period from the detection to the restart of measurement. Therefore, there is a risk of failing to detect the retro reflector 11. The reason why the restarting control processing explained above is performed is to avoid such a risk. After the restarting control step S11, the process returns to the step S2. Then, the procedure for the tracking of the retro reflector 11 and the measurement of a distance to the retro reflector 11 is resumed.

The present embodiment of the invention explained above produces the following advantageous effects.

(1) Upon losing sight of the retro reflector 11, the interferometer 1 emits a beam of measurement light along a predetermined pattern so as to search for the retro reflector 11. The interferometer 1 restarts the tracking of the retro reflector 11 when the retro reflector 11 has now been found. Therefore, it is possible to resume the measurement of a distance to the retro reflector 11 even when the interferometer 1 loses sight of the retro reflector 11.

(2) The emission pattern of measurement light that is used when the interferometer 1 searches for the retro reflector 11 is a spiral pattern whose center is a given point P that lies in the direction of emission of measurement light when the interferometer 1 lost sight of the retro reflector 11. With such a feature, it is possible to search for the retro reflector 11 efficiently without a detection failure, or with a substantially reduced risk of a detection failure.

(3) The emission pattern of measurement light that is used when the interferometer 1 searches for the retro reflector 11 is a spiral pattern that includes a plurality of curved successive turnings and has the constant separation distance f between the inner turning and the outer turning of each two adjacent turnings. In addition, the constant separation distance f between the inner turning and the outer turning of each two adjacent turnings of the spiral is set at a value that is not larger than the width d of the light-receivable area of each of the first light reception unit 413 and the second light reception unit 422. With such a feature, it is possible to substantially reduce the risk of a detection failure.

(4) If the measurement of a distance to the retro reflector 11 were resumed immediately upon the detection of the retro reflector 11 as a result of search for the retro reflector 11, the emission direction of measurement light could be shifted from the direction in which the retro reflector 11 has now been found due to the inertial force of the changing mechanism 121 that acts during a time period from the detection to the restart of measurement. Therefore, there is a risk of failing to detect the retro reflector 11. In contrast, in the present embodiment of the invention, when the retro reflector 11 has now been found as a result of search for the retro reflector 11, emission direction control processing is performed to direct measurement light in the direction in which the retro reflector 11 has been found. Thereafter, the measurement of a distance to the retro reflector 11 is resumed. With such a feature, it is possible to detect the retro reflector 11 without fault. Accordingly, the measurement of the distance to the retro reflector 11 can be resumed reliably.

Variation Examples of Foregoing Embodiment

Figure 7:
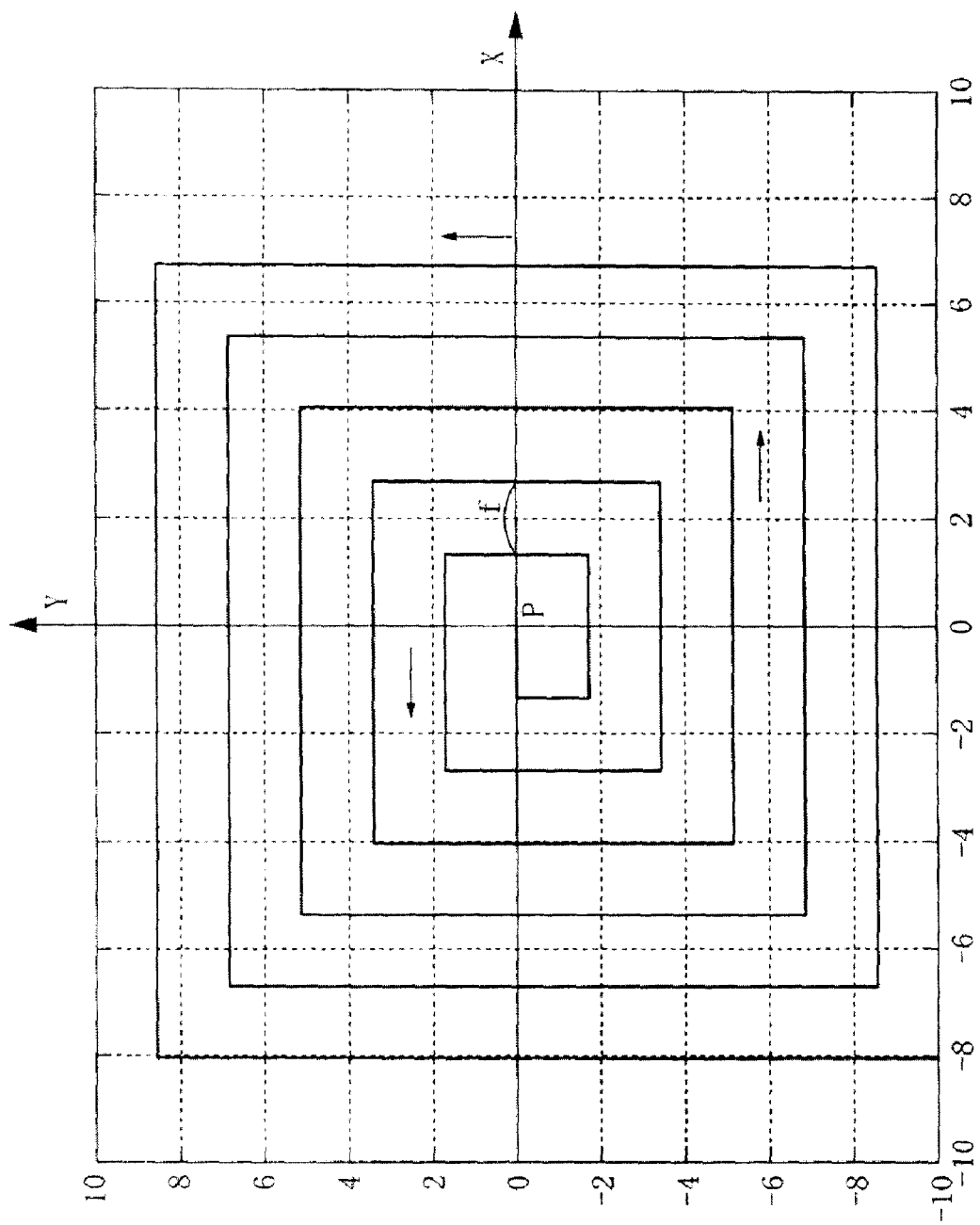
FIG. 7 is a diagram that schematically illustrates a spiral pattern according to a variation example of an exemplary embodiment of the invention.

The scope of the invention is not limited to the foregoing embodiment. Various modifications, improvements, and the like that are made within a range in which an object of the invention is achieved are encompassed therein. FIG. 7 is a diagram that schematically illustrates a spiral pattern according to a variation example of the foregoing embodiment of the invention. In the foregoing embodiment of the invention, it is explained that the pattern generation unit 53 generates a "curved spiral pattern" (i.e., ordinary spiral pattern) that includes a plurality of curved successive turnings and has the constant separation distance f between the inner turning and the outer turning of each two adjacent turnings. However, the scope of the invention is not limited to such an example. As illustrated in FIG. 7, the pattern generation unit 53 may generate a "non-curved spiral pattern" (e.g., square spiral pattern) that includes a plurality of non-curved successive turnings and has a constant separation distance f between the inner turning and the outer turning of each two adjacent turnings. A plurality of line segments constitutes the plurality of non-curved successive turnings. The term "spiral" used in the appended claims is not intended to limit the scope of the invention to various curved patterns only.

In the foregoing embodiment of the invention, it is explained that the pattern generation unit 53 generates a spiral pattern. However, the scope of the invention is not limited to such an example. For example, the pattern generation unit 53 may generate a sequential scanning pattern along which the interferometer 1 performs sequential scanning operation for rows (or columns) in a direction from one side to the other, for example, from top to bottom.

In the foregoing embodiment of the invention, the pattern generation unit 53 sets the center point P of a spiral pattern. It is explained that the center point P lies in the direction of emission of measurement light when the interferometer 1 lost sight of the retro reflector 11. In addition, the center point P is set at a position away from the reference point c by a certain distance to the retro reflector 11, which was calculated by the distance calculation unit 31 when the interferometer 1 lost sight of the retro reflector 11. Notwithstanding the foregoing, however, the pattern generation unit 53 may set the center point P of a spiral pattern at any arbitrary position in the direction of emission of measurement light when the interferometer 1 lost sight of the retro reflector 11.

In the foregoing embodiment of the invention, it is explained that the changing mechanism control unit 5 judges whether the interferometer 1 has now lost sight of the retro reflector 11 or not on the basis of a received-light signal outputted from each of the first light reception unit 413 and the second light reception unit 422 and judges whether the interferometer 1 has now found the retro reflector 11 or not on the basis thereof to execute the pattern emission control step S7 and the tracking control step S5. However, the scope of the invention is not limited to the foregoing example. The changing mechanism control unit 5 may perform each judgment processing on the basis of either one of received-light signals outputted respectively from the first light reception unit 413 and the second light reception unit 422 only to execute the pattern emission control step S7 and the tracking control step S5.

That is, on the basis of either one of received-light signals outputted respectively from the first light reception unit 413 and the second light reception unit 422 only, the first judgment unit 521 may judge whether the amount of light received at the one light reception unit mentioned above (413 or 422) is not greater than the predetermined first threshold value. Then, the pattern generation unit 53 may generate a spiral pattern in a case where it has been judged by the first judgment unit 521 that the amount of light received at the one light reception unit is not greater than the predetermined first threshold value. In like manner, on the basis of the one of received-light signals outputted respectively from the first light reception unit 413 and the second light reception unit 422 only, the second judgment unit 522 may judge whether the amount of light received at the one light reception unit is greater than the predetermined second threshold value. The steps S10, S11, and S2 to S5 are executed in a case where it has been judged by the second judgment unit 522 that the amount of light received at the one light reception unit is greater than the predetermined second threshold value. The tracking control unit 51 causes the changing mechanism 121 to keep track of the retro reflector 11 in the step S5. The above modified configuration in which the changing mechanism control unit 5 performs each judgment processing on the basis of either one of received-light signals outputted respectively from the first light reception unit 413 and the second light reception unit 422 only to execute the pattern emission control step S7 and the tracking control step S5 produces the same advantageous effects as those of the foregoing embodiment, or similar thereto. Besides the foregoing advantages, the modified configuration has an advantage of simplicity because each judgment processing is performed on the basis of either one of received-light signals outputted respectively from the first and second light reception units only.

In the foregoing embodiment of the invention, the interferometer 1 starts a search for the retro reflector 11 upon losing sight of the retro reflector 11. The interferometer 1 may search for the retro reflector 11 immediately after activation. For example, the search upon activation can be carried out as follows. The interferometer 1 emits a beam of measurement light in an arbitrary direction immediately after activation. In addition, the interferometer 1 determines the center point P of a spiral pattern at an arbitrary position in the emission direction of the beam of measurement light. Next, the interferometer 1 sets a plane that passes through the point P and is orthogonal to the emission direction of the measurement light. Then, the interferometer 1 generates a spiral pattern whose center is the point P on the plane. The interferometer 1 searches for the retro reflector 11 while emitting measurement light along the generated pattern.

The invention can be applied to a tracking-type laser interferometer.

What is claimed is:

1. A tracking-type laser interferometer comprising:
    a light source;
    a retro reflector that is attached to a movement member and reflects light propagating from the light source;
    a reference plane that reflects light coming from the light source;
    a first light receiving section that receives interference light turned from return light and reference light, the return light propagating back from the retro reflector, the reference light being reflected at the reference plane, the first light receiving section outputting a received-light signal dependent on received-light amount and a change in a distance to the retro reflector upon receiving the interference light;
    a second light receiving section that receives the return light to output a received-light signal dependent on received-light amount and shift amount of the return light;
    a changing mechanism that changes a direction of emission of the light propagating from the light source;
    a changing mechanism controlling section that controls the changing mechanism based upon the received-light signal outputted from the second light receiving section such that the shift amount is within a predetermined range to cause the changing mechanism to keep track of the retro reflector, the changing mechanism controlling section including
        a first judging section,
        a second judging section,
        a pattern emission controlling section, and
        a tracking controlling section; and
    a distance calculating section that calculates the distance from a predetermined reference point to the retro reflector by means of the received-light signal outputted from the first light receiving section,
    wherein the first judging section judges whether at least one of the received-light amount at the first light receiving section and the received-light amount at the second light receiving section is not greater than a predetermined first threshold value, which is set individually for each of the first and second light receiving sections,
wherein the pattern emission controlling section controls the changing mechanism such that the light propagating from the light source should be emitted along a predetermined pattern in a case where it has been judged by the first judging section that at least one of the received-light amount at the first light receiving section and the received-light amount at the second light receiving section is not greater than the predetermined first threshold value,
wherein the second judging section judges whether both of the received-light amount at the first light receiving section and the received-light amount at the second light receiving section are greater than, or not less than, predetermined second threshold values, which are set respectively for the first and second light receiving sections, and
wherein the tracking controlling section controls the changing mechanism such that the shift amount falls within the predetermined range to cause the changing mechanism to keep track of the retro reflector in a case where it has been judged by the second judging section that both of the received-light amount at the first light receiving section and the received-light amount at the second light receiving section are greater than, or not less than, the predetermined second threshold values.

2. The tracking-type laser interferometer according to claim 1, wherein the predetermined pattern is a spiral pattern that starts at a given point and goes away from the given point outward while turning around the given point as the center of the spiral pattern on a plane; the given point lies in a direction of emission of light propagating from the light source when it is judged by the first judging section that the received-light amount is not greater than the predetermined first threshold value; the plane passes through the given point; and the plane is orthogonal to the direction of emission of the light propagating from the light source.

3. The tracking-type laser interferometer according to claim 2, wherein the given point is set at a position away from the reference point by a certain distance to the retro reflector calculated by the distance calculating section when judged by the first judging section that the received-light amount is not greater than the predetermined first threshold value; the predetermined pattern is a spiral pattern that includes a plurality of curved successive turnings and has a constant separation distance between the inner turning and the outer turning of each two adjacent turnings; and the constant separation distance between the inner turning and the outer turning of each two adjacent turnings of the spiral is set at a value that is not larger than the width of a light-receivable area of the light receiving section for which it has been judged by the first judging section that the received-light amount is not greater than the predetermined first threshold value.

4. A tracking-type laser interferometer comprising:
a light source;
a retro reflector that is attached to a movement member and reflects light propagating from the light source;
a reference plane that reflects light coming from the light source;
a first light receiving section that receives interference light turned from return light and reference light, the return light propagating back from the retro reflector, the reference light being reflected at the reference plane, the first light receiving section outputting a received-light signal dependent on received-light amount and a change in a distance to the retro reflector upon receiving the interference light;
a second light receiving section that receives the return light to output a received-light signal dependent on received-light amount and shift amount of the return light;
a changing mechanism that changes a direction of emission of the light propagating from the light source;
a changing mechanism controlling section that controls the changing mechanism based upon the received-light signal outputted from the second light receiving section such that the shift amount falls within a predetermined range to cause the changing mechanism to keep track of the retro reflector, the changing mechanism controlling section including
a first judging section,
a second judging section,
a pattern emission controlling section, and
a tracking controlling section; and
a distance calculating section that calculates a distance from a predetermined reference point to the retro reflector by means of the received-light signal outputted from the first light receiving section,
wherein the first judging section judges, on the basis of either one of the received-light signals outputted respectively from the first and second light receiving sections only, whether the received-light amount at said one light receiving section is not greater than the predetermined first threshold value,
wherein the pattern emission controlling section controls the changing mechanism such that the light propagating from the light source should be emitted along a predetermined pattern in a case where it has been judged by the first judging section that the received-light amount at said one light receiving section is not greater than the predetermined first threshold value,
wherein the second judging section judges, based upon said one of the received-light signals outputted respectively from the first and second light receiving sections only, whether the received-light amount at said one light receiving section is greater than, or not less than, the predetermined second threshold value, and
wherein the tracking controlling section controls the changing mechanism such that the shift amount falls within the predetermined range to cause the changing mechanism to keep track of the retro reflector in a case where it has been judged by the second judging section that the received-light amount at said one light receiving section is greater than, or not less than, the predetermined second threshold value.

5. The tracking-type laser interferometer according to claim 4, wherein the predetermined pattern is a spiral pattern that starts at a given point and goes away from the given point outward while turning around the given point as the center of the spiral pattern on a plane; the given point lies in a direction of emission of light propagating from the light source when it is judged by the first judging section that the received-light amount is not greater than the predetermined first threshold value; the plane passes through the given point; and the plane is orthogonal to the direction of emission of the light propagating from the light source.

6. The tracking-type laser interferometer according to claim 5, wherein the given point is set at a position away from the reference point by a certain distance to the retro reflector calculated by the distance calculating section when judged by the first judging section that the received-light amount is not greater than the predetermined first threshold value; the predetermined pattern is a spiral pattern that includes a plurality of curved successive turnings and has a constant separation distance between the inner turning and the outer turning of each two adjacent turnings; and the constant separation distance between the inner turning and the outer turning of each two adjacent turnings of the spiral is set at a value that is not larger than the width of a light-receivable area of the light receiving section for which it has been judged by the first judging section that the received-light amount is not greater than the predetermined first threshold value.

* * * * *